(12) United States Patent
Hamada et al.

(10) Patent No.: US 6,555,264 B1
(45) Date of Patent: *Apr. 29, 2003

(54) BATTERY MODULE HAVING A PLURALITY OF INTERCONNECTED BATTERIES

(75) Inventors: Shinji Hamada, Toyohashi (JP); Yoshiaki Ogata, Toyohashi (JP); Noriyuki Fujioka, Kosai (JP); Munehisa Ikoma, Toyohashi (JP); Toyohiko Eto, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 51 days.

This patent is subject to a terminal disclaimer.

(21) Appl. No.: 09/668,380

(22) Filed: Sep. 25, 2000

(30) Foreign Application Priority Data

Oct. 8, 1999 (JP) ............................................. 11-288793
Mar. 30, 2000 (JP) ...................................... 2000-094664

(51) Int. Cl.[7] .............................................. H01M 6/42
(52) U.S. Cl. ........................ 429/156; 429/149; 429/159; 429/163; 429/281.2
(58) Field of Search ................................ 429/149, 156, 429/159, 163, 100, 281.2

(56) References Cited

U.S. PATENT DOCUMENTS 4,339,049 A 7/1982 Gillespie
5,736,272 A * 4/1998 Veenstra et al. ............. 429/100
5,800,942 A 9/1998 Hamada et al.
5,906,899 A * 5/1999 Noda et al. .................. 429/149
6,033,800 A 3/2000 Ichiyanagi et al.
6,304,057 B1 * 10/2001 Hamada et al. .............. 320/107

FOREIGN PATENT DOCUMENTS

| EP | 0771037 | 5/1997 |
|---|---|---|
| EP | 0817287 | 1/1998 |
| EP | 1059680 | 12/2000 |

OTHER PUBLICATIONS

David Linden, "Handbook of Batteries," McGraw–Hill, Inc., 1985.*
David LInden, "Handbook of Batteries," McGraw–Hill, Inc., 1985.*

* cited by examiner

Primary Examiner—Carol Chaney
Assistant Examiner—Dah-Wei Yuan
(74) Attorney, Agent, or Firm—Greenblum & Bernstein, P.L.C.

(57) ABSTRACT

A plurality of cells each encased in prismatic cell cases having short lateral walls and long lateral walls are arranged side by side, with adjacent short lateral walls being integral with each other, thereby constituting an integral battery case. The upper open ends of the plurality of prismatic cell cases are integrally closed by a single lid member. Each of the cells accommodates therein a group of electrodes stacked alternately upon one another parallel to the long lateral walls of the cell cases with intervening separators therebetween. Neighboring cells are connected in series at their abutting lateral opposite ends with each other.

9 Claims, 7 Drawing Sheets

BATTERY MODULE HAVING A PLURALITY OF INTERCONNECTED BATTERIES

BACKGROUND OF THE INVENTION

1. Field of the Invention

The present invention relates to a battery module constituted by connecting a plurality of cells so as to obtain a necessary power capacity.

2. Description of Related Art

FIG. 9 shows a conventional battery module made by connecting a plurality of rechargeable batteries and coupling them together as one so as to obtain the necessary power. In this battery module, a plurality of cells 31 (31a to 31j) made of sealed alkaline rechargeable batteries as shown in FIG. 10 are arranged side by side, with the long lateral walls of their battery cases 32 adjacent each other. End plates 42 are arranged against the outside of the cells 31a and 31j at both ends, and the group of batteries and the two end plates 42 are bound together with binding bands 43 so as to couple the cells together as one piece.

For the cells 31, an electrode plate group 37, comprising positive electrode plates and negative electrode plates layered with intervening separators, thereby constituting elements for electromotive force, is accommodated in a battery case 32 together with a liquid electrolyte, and the open end of the battery case 32 is closed with a lid 36 provided with a safety vent 35. From the upper end at one side of the positive electrode plates forming the electrode plate group 37, leads 39 extend upward and are connected to a positive electrode terminal 33 above them, and similarly, from the upper end of the other side of the negative electrode plates, leads 39 extend upward and are connected to an negative electrode terminal 34 above them. The positive electrode terminal 33 and the negative electrode terminal 34 are attached to the lid 36.

The positive electrode terminals 33 and negative electrode terminals 34 of coupled neighboring cells 31 are connected by connection plates 41, thereby connecting all cells 31 in series. When the battery cases 32 are coupled, ribs 38, which protrude vertically from the long lateral walls of the battery cases 32, are abutted against each other, forming coolant passages running in the vertical direction along the long lateral walls of the battery cases 32 in the space between ribs 38. The cells 31a to 31j are cooled by flowing air through these coolant passages.

With the configuration of this conventional battery module, individual cells 31 are arranged in parallel, with the ribs 38 on the long lateral walls of the cell cases 32 being abutted each other. While each of the cells 31 can be cooled substantially uniformly by the coolant passages formed between the ribs 38 on one hand, the entire battery module cannot be made compact by the space provided for the coolant passages on the other hand.

If the pitch space between adjacent ribs 38 is made smaller, the cross-sectional area of the coolant passages formed between the ribs 38 become smaller, and the cooling performance will decrease accordingly. Conversely, if the ribs 38 area arranged at a wider pitch space, the walls of each cell case 32 will more easily expand outwards by the internal pressure of each cell 31, whereby the cross-sectional area of the coolant passages will become smaller and the cooling performance will deteriorate. On the other hand, if the walls of the cell cases 32 are made thicker as the countermeasure against the internal pressure of the cells, heat conductivity will deteriorate, and the cooling performance will anyway deteriorate.

SUMMARY OF THE INVENTION

In view of these problems of the prior art, it is an object of the present invention to provide a battery module of a compact structure, in which each of the cells constituting the battery module can be uniformly cooled highly efficiently.

To achieve the above object, a battery module according to the present invention comprises:

a plurality of prismatic cell cases having short lateral walls and long lateral walls arranged side by side, with adjacent short lateral walls being integral with each other; and a single lid member for integrally closing upper open ends of the plurality of prismatic cell cases, wherein each of the cell cases accommodates therein a group of electrodes comprising a group of positive electrode plates and a group of negative electrode plates stacked alternately upon one another parallel to the long lateral walls of the cell cases with intervening separators therebetween, thereby constituting rechargeable batteries respectively, and neighboring rechargeable batteries are connected in series at their opposite lateral ends with each other.

Since neighboring cell cases share their short lateral walls, and no cooling space is provided between the cells, the battery module can be made compact as a whole. Further, since each of the cells accommodates therein a group of electrode plates stacked parallel to the long lateral walls of the cell cases, and the neighboring cells are mutually connected in series at the opposite ends of the long lateral walls, the cells can be connected together compactly. Moreover, the battery module is cooled as a whole along the long lateral walls of the integral battery case formed as one continuous plane, so that each of cells constituting the battery module is uniformly and efficiently cooled.

Other and further objects, features and advantages of the invention will appear more fully from the following description.

DESCRIPTION OF PREFERRED EMBODIMENTS

A battery module according to one embodiment of the present invention will be hereinafter described with reference to FIGS. 1 to 8.

Figure 1:
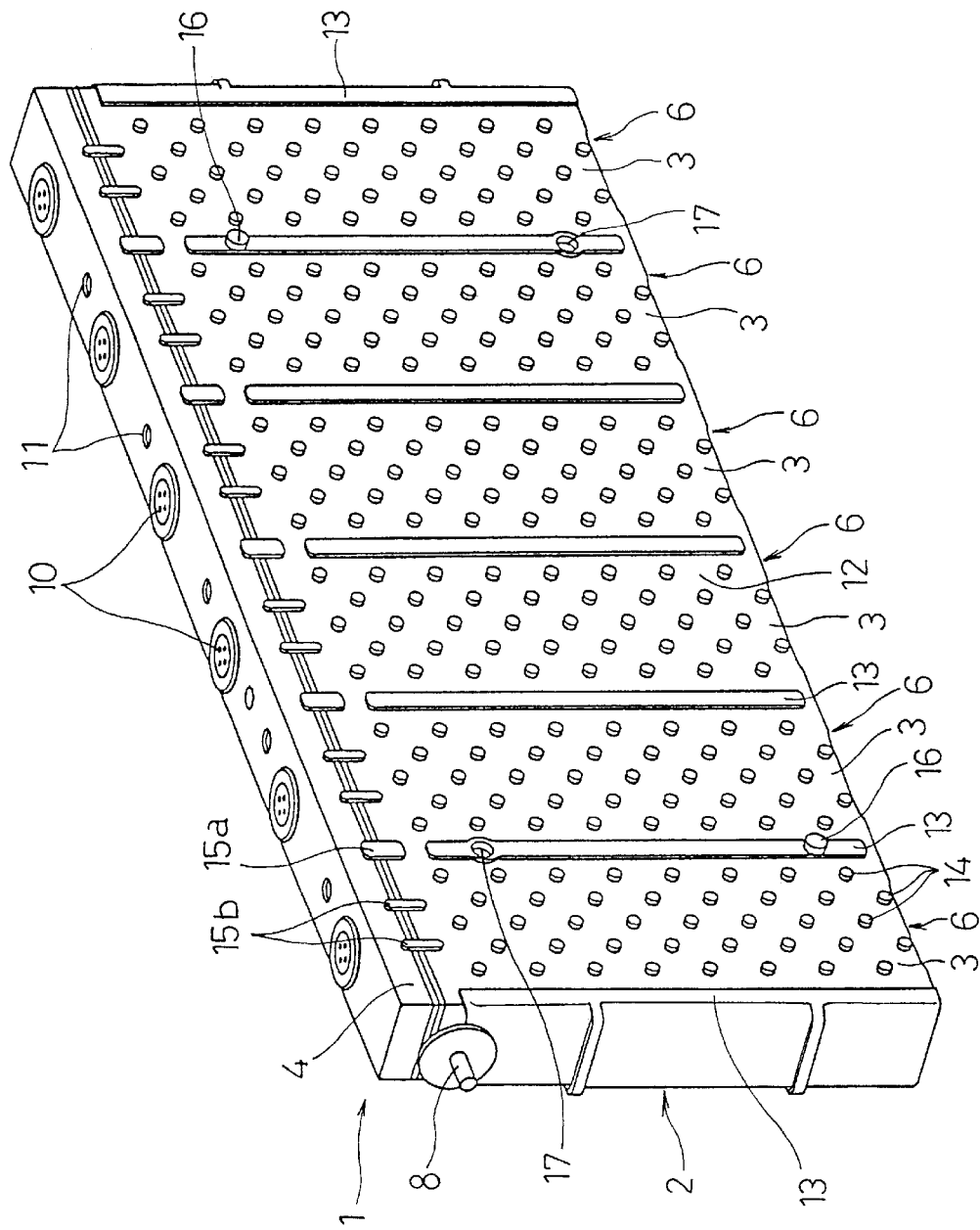
FIG. 1 is an external perspective view of a battery module according to one embodiment of the present invention.
Figure 2:
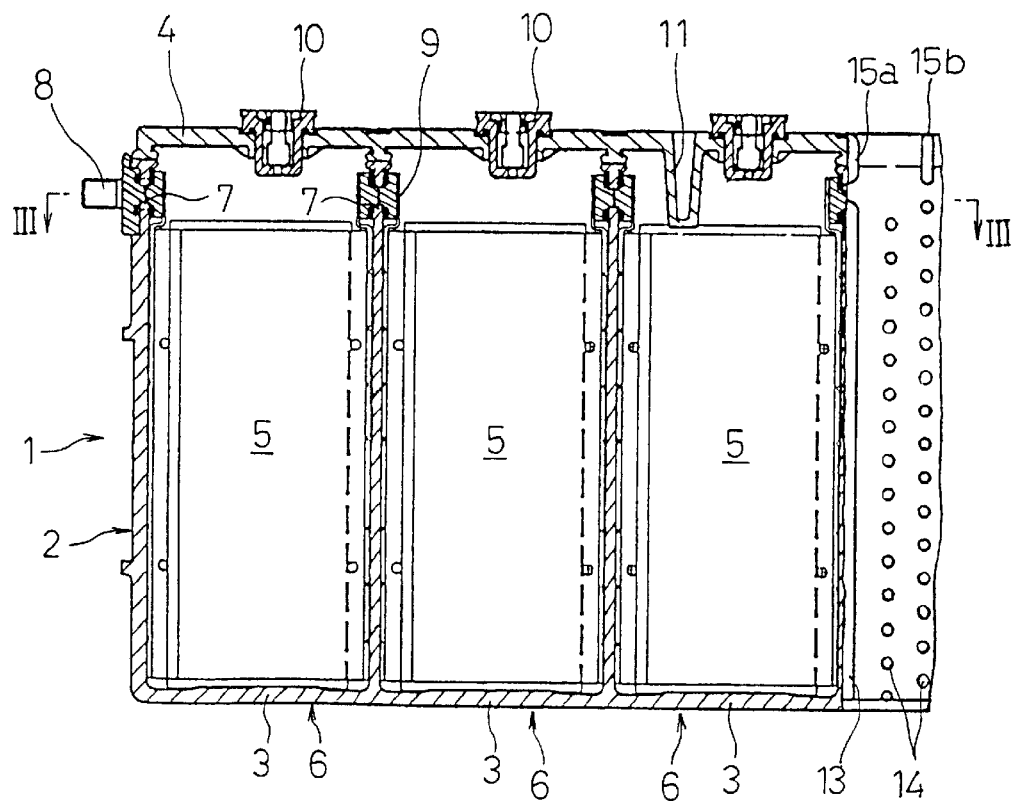
FIG. 2 is a partial lateral cross-sectional view of the same.
Figure 3:
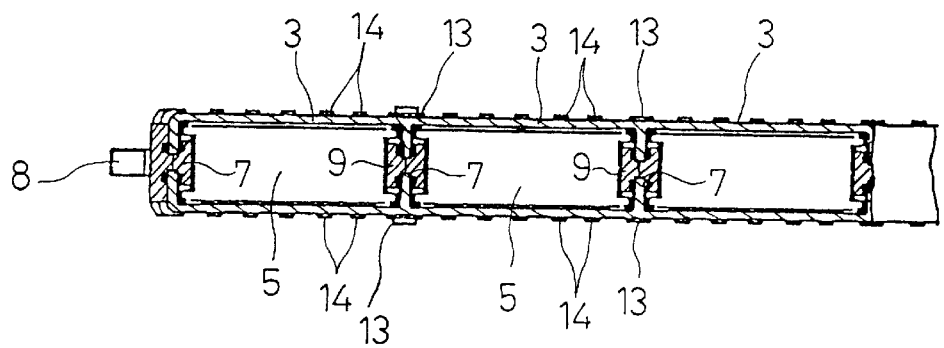
FIG. 3 is a cross-sectional view taken in the direction of the arrows along the line III—III in FIG. 2.

The battery module 1 of this embodiment is a nickel metal hydride battery, which is suitable for use as a drive power source for an electric vehicle. As shown in FIGS. 1 to 3, the battery module 1 is made up of a plurality of (six in the example shown in the drawing) cells 6, arranged in a row. Cell cases 3 of each of the cells 6, which are formed in a prismatic fashion with short lateral walls, long lateral walls, and open top ends, are mutually integrated on their short lateral walls, thereby constituting an integral battery case 2. The upper open ends of the cell cases 3 are closed all together by an integral lid member 4.

Each of the battery cases 3 constitutes a cell 6, accommodating therein an electrode plate unit 5 together with electrolyte. The electrode plate group 5 comprises a large number of positive electrode plates and negative electrode plates arranged parallel to the long lateral walls of the cell cases 3 and layered in the direction of the short lateral walls of the cell cases 3, with intervening separators therebetween.

Connection holes 7 are formed at the upper edge portions of the outer short lateral walls of the cell cases 3 at the two ends of the integral battery case 2 and between each two cell cases 3. Positive and negative connection terminals 8 are respectively mounted to the connection holes 7 at the outer short lateral walls of the two outer cell cases 3, and connection fittings 9 for serially connecting two adjacent cells 6 are mounted to the connection holes 7 in the intermediate short lateral walls between each two cell cases 3. In addition, the lid member 4 is provided with one safety vent 10 for each of the cell case 3, so as to release pressure when the internal pressure in the cell cases 3 has exceeded a certain value. Moreover, a sensor mounting hole 11 for mounting a temperature detection sensor for detecting the temperature of the cells 6 is formed at suitable cells 6 or for each cell 6.

The long lateral walls of six cells 6 together form an integral side wall 12 of the integral battery case 2. On this side wall 12 of the integral battery case 2, protruding ribs 13 that extend vertically are provided at positions corresponding to the lateral edges of two adjacent cell cases 3. Further, a large number of relatively small circular protrusions 14 are formed at suitable intervals in matrix fashion between each two ribs 13. The ribs 13 and the protrusions 14 have the same height. Furthermore, coupling ribs 15a and 15b having the same height as the ribs 13 and the protrusions 14 are formed on the side walls of the upper edge of the cell cases 3 and the side walls of the lid member 4, such as to bridge across the side walls of the cell cases 3 and the lid member 4, at positions corresponding to an extension of the ribs 13 and the protrusions 14. A plurality of protrusions 16 and indentations 17, for positioning and fitting together integral battery cases 2 when their side walls 12 are abutted on each other, are arranged at an upper portion and a lower portion of the outer surface of the two ribs 13 near both ends of the side wall 12 of the integral battery case 2. When a plurality of integral battery cases 2 are arranged in a row in parallel to constitute a battery pack, the ribs 13, the protrusions 14 and the coupling ribs 15a and 15b form coolant passages for cooling the cell cases 3 effectively and uniformly.

Figure 4:
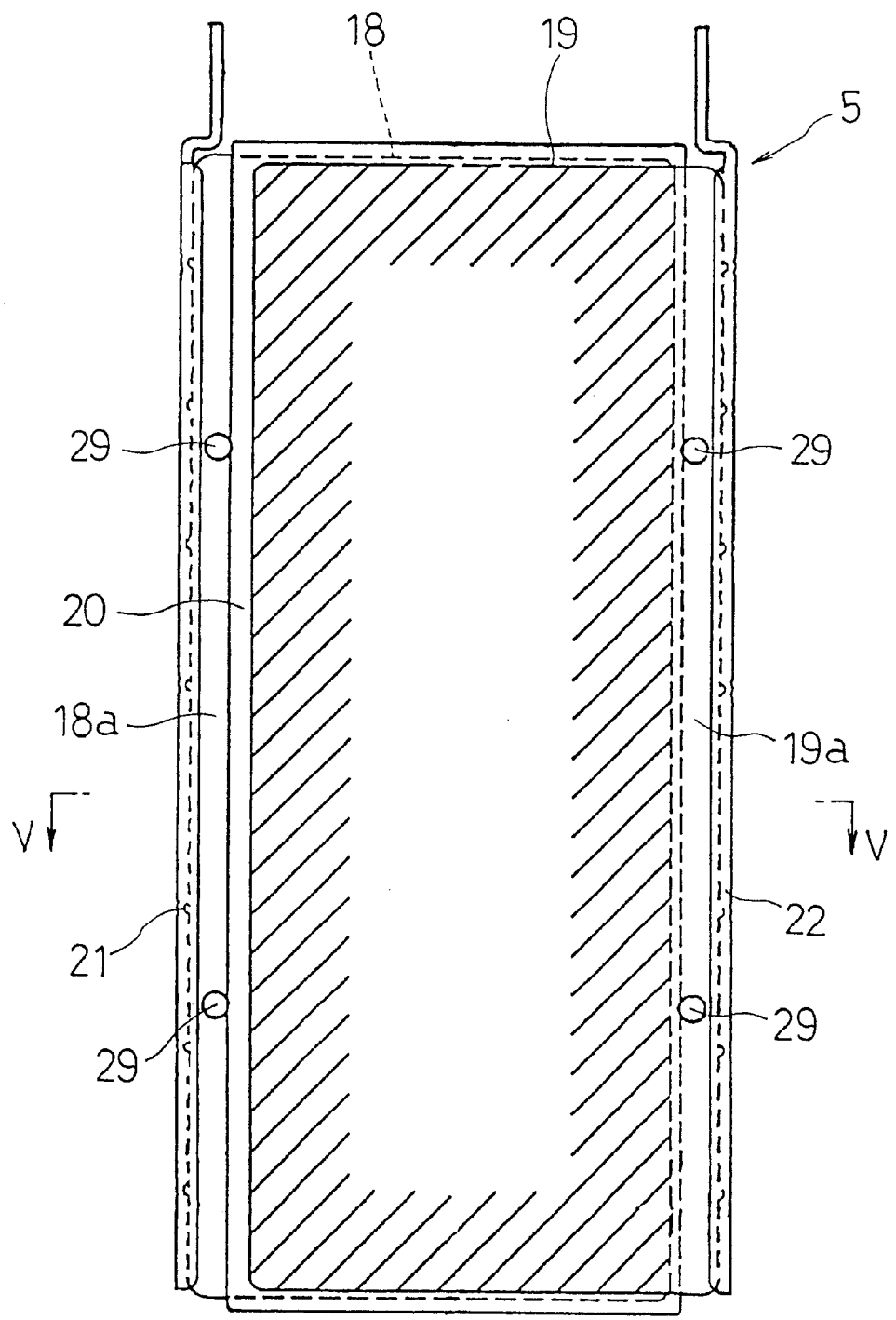
FIG. 4 is a front view of an electrode plate unit of the same embodiment.
Figure 5:
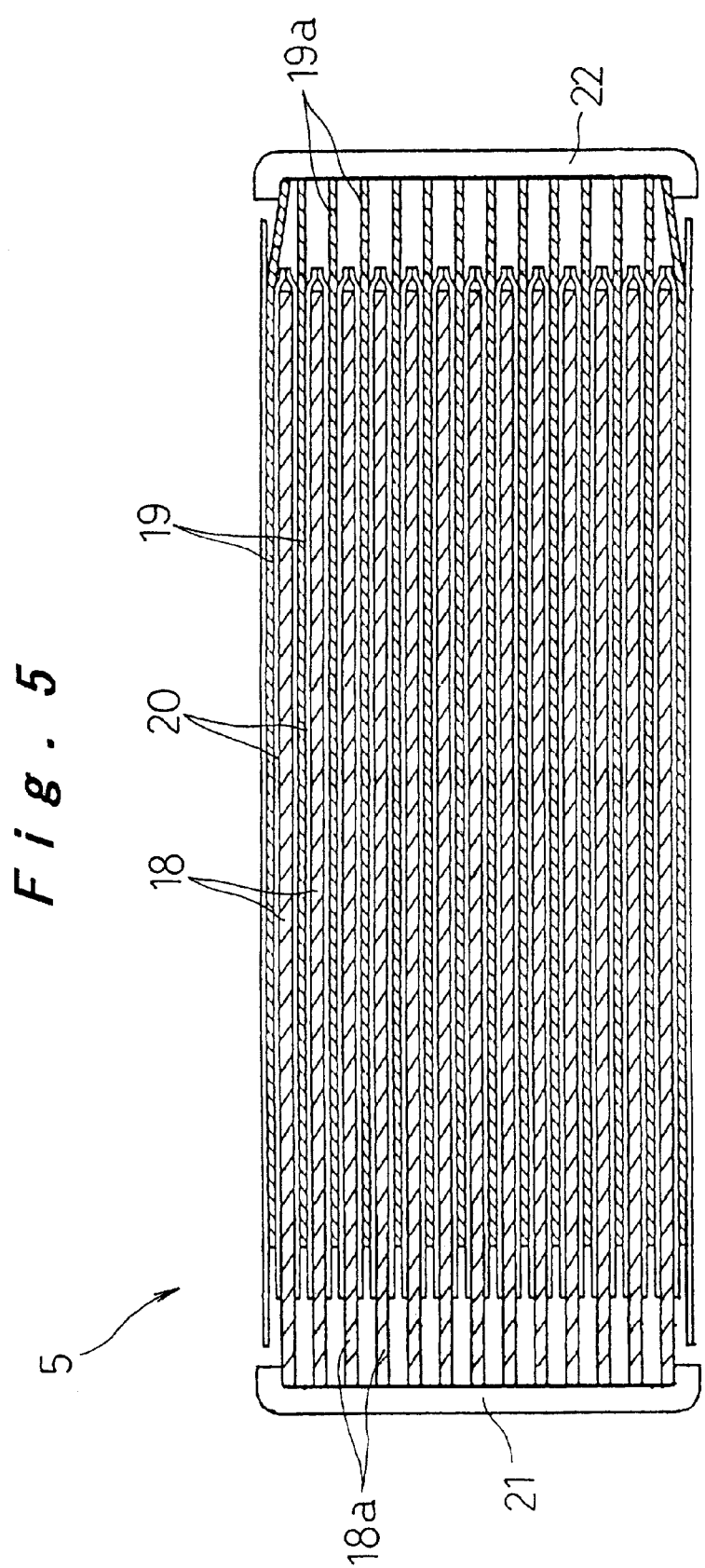
FIG. 5 is a cross-sectional view taken in the direction of the arrows along the line V—V in FIG. 4.

The aforementioned electrode plate groups 5 are explained in detail with reference to FIGS. 4 and 5. Positive electrode plate is made of Ni foamed metal, and negative electrode plate is made by filling an active material in a Ni punched metal. A large number of positive electrode plates 18 and negative electrode plates 19 are arranged alternately, and the positive electrode plates 18 are covered with separators 20 in the form of a bag having an opening on one side. The positive electrode plates 18 and the negative electrode plates 19 are stacked upon one another with separators 20 therebetween, thereby constituting the electrode plate unit 5. In FIG. 4, the region where the positive electrode plates 18 and the negative electrode plates 19 oppose each other with the intervening separators 20 and generate electric power is indicated by oblique lines.

The lateral edges of the group of positive electrode plates 18 protrude beyond the group of negative electrode plates 19 on one side, and the lateral edges of the group of negative electrode plates 19 protrude beyond the group of positive electrode plates 18 on the opposite side, and these protruding lateral portions form the lead portions 18a and 19a, to the lateral ends of which collector plates 21 and 22 are welded, respectively. The outer edges of the collector plates 21 and 22 are bent toward the inside, in order to restrict the dimensions of the electrode plates 18, 19 during the collector plates 21, 22 are welded to the electrode plates 18, 19, so that the electrode plates 18, 19 do not spread outwards as pressure is applied thereto. Numeral 29 denotes pairs of positioning holes formed in the lead portions 18a and 19a at a suitable distance from the top and the bottom thereof. By inserting positioning pins into these positioning holes 29 and by applying pressure on the lateral ends of the lead portions 18a and 19a, these lateral ends of the lead portions 18a and 19a are aligned and welded reliably and evenly to the collector plates 21 and 22.

Figure 6:
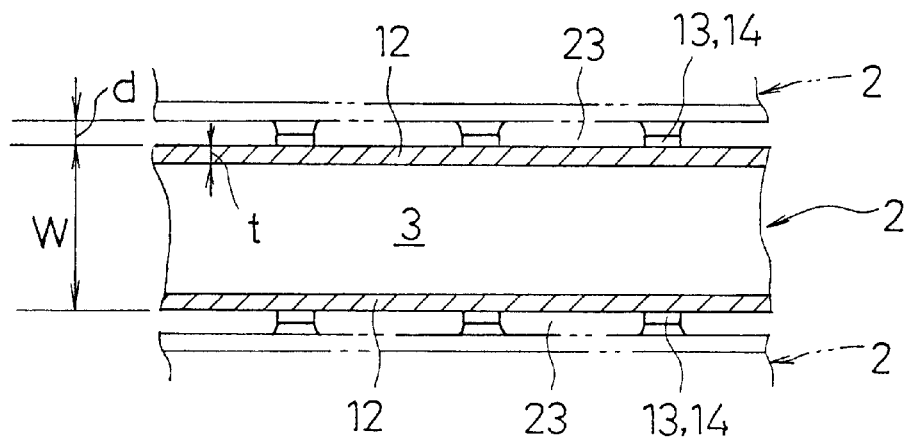
FIG. 6 is a partial cross-sectional view of an integral battery case when it is arranged in parallel with another integral battery case.

Dimensions of the integral battery case 2 such as the width and the thickness of the walls of cell cases 3 and the height of the ribs 13 and protrusions 14 are set $t \leq W/10$, and $t < d$, as shown in FIG. 6, where t is the thickness of the long lateral walls of the cell cases 3, W is the width of the short lateral walls of the cell cases 3, an d d is the space or the thickness of the coolant passages 23 formed between adjacent integral battery cases 2 when a plurality of battery modules are arranged in parallel with their long lateral walls 12 abutted each other, this being determined by the height of the ribs 13 and the protrusions 14.

Figures 7A, 7B:
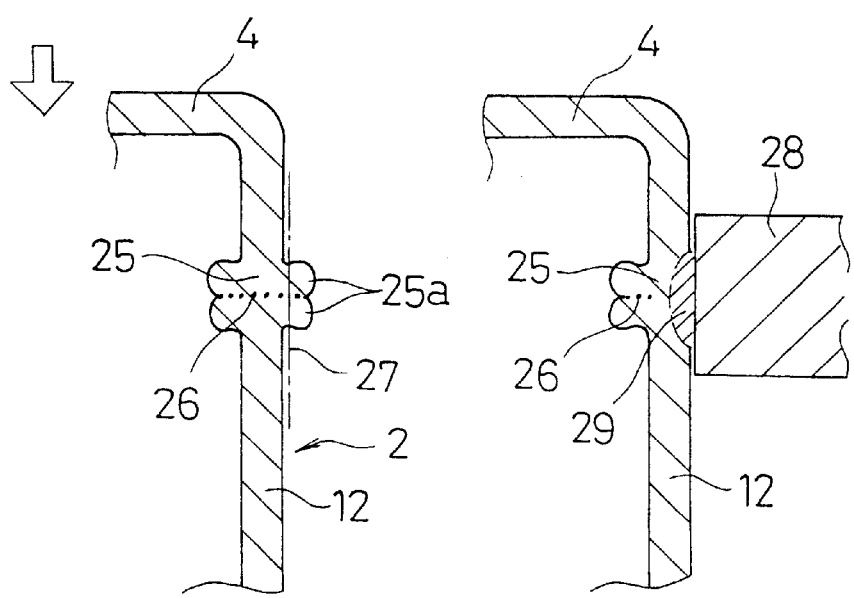
FIGS. 7A and 7B illustrate a welding portion between the integral battery case and the lid member, FIG. 7A being a vertical cross-sectional view showing the welding portion before processing, and FIG. 7B being a vertical cross-sectional view showing the welding portion after a re-melting process.

When a lid member 4 is bonded to the integral battery case 2, respective bonding parts of the lid member 4 and the integral battery case 2 are pressed together and heated so that they are welded together as shown in FIG. 7A. However, with such method, welded resin protrudes and a welding burr 25a is formed on the outer and inner sides of the welding portion 25. Since such burr 25a will become an obstacle in the coolant passages 23, it has been believed that such burr must be removed along the cutting plane 27 indicated by a dotted line.

However, in case foreign substances such as dusts exist between the bonding surfaces of the integral battery case 2 and the lid member 4, or if water component contained in the resin has been vaporized, creating air holes therebehind, pin holes 26 are sometimes formed within the welding portion 25. In this case, if part of the welding portion 25 is removed, there is the possibility that a pin hole 26 communicates with the outside, thereby compromising the sealing performance of the cell 3.

Accordingly, at locations where no connecting ribs 15a, 15b are formed across the lateral walls of the integral battery case 2 and the lid member 4, the welding burr 25a on the outer side of the welding portion 25 is re-melted with a correction plate 28 being pressed against the welding burr 25a, as shown in FIG. 7B. Thereby, a relatively flat re-welded portion 29 is formed on the outer side, which is substantially flush with or slightly bulging from the long lateral walls 12 of the integral battery case 2, and which has no pin holes 26 therein. By forming such re-welded portion 29, a highly reliable seal is formed between the lid member 4 and the integral battery case 2, and there will be no obstacles in the coolant passages 23. Moreover, there will be no stress concentration at the welding portions 25 even in the event of abnormal rise in battery internal pressure.

Figure 8:
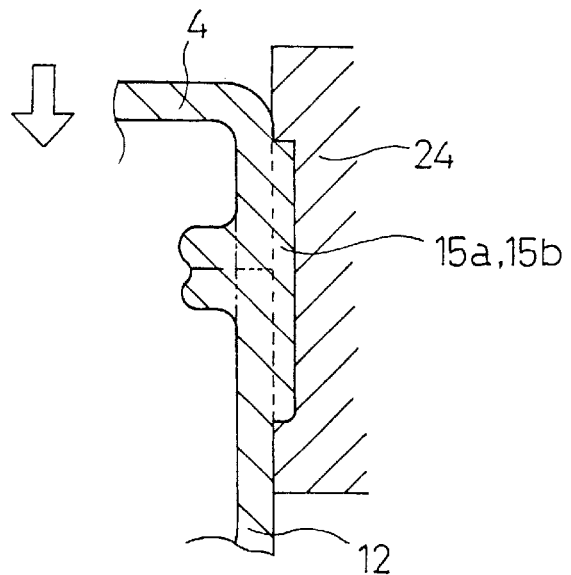
FIG. 8 is a vertical cross-sectional view showing a process of forming a connecting rib on the long lateral wall of the integral battery.
Figure 9:
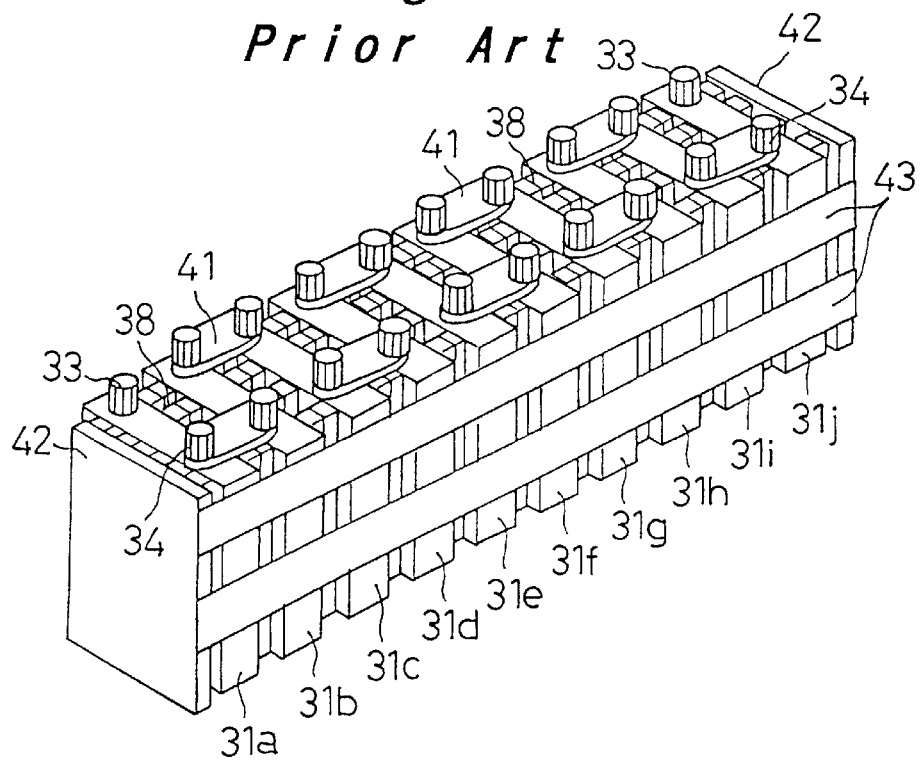
FIG. 9 is an external perspective view of a conventional battery module.
Figure 10:
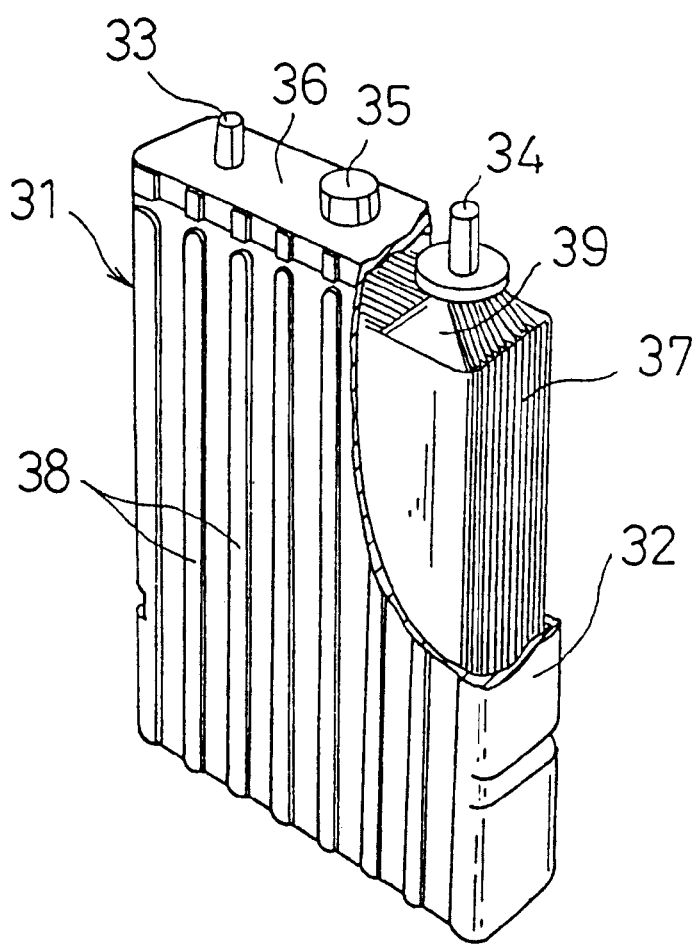
FIG. 10 is a partially cutaway perspective view of a cell of the same conventional example.

In this embodiment, in order to form the connection ribs 15a, 15b on the lateral surfaces over the integral battery case 2 and the lid member 4, when welding them together, a mold 24 having recesses that conform to the shapes of the connection ribs 15a, 15b is abutted to one side of the welding portion between the integral battery case 2 and the lid member 4, as shown in FIG. 8, while heat is applied to the welding portion and the lid member 4 is pressed against the integral battery case 2 in the direction indicated by the arrow. Thereby, the molten resin that protrudes outwards as welding proceeds is molded into the shape of the ribs 15a, 15b, and no irregular welding burrs 25a are formed. Therefore, there exist no obstacles in the coolant passages 23 at portions where the integral battery case 2 and the lid member 4 are welded together.

Even when the connection ribs 15a, 15b are formed as described above so that no burrs are formed, it is preferable to perform the aforementioned process of forming a re-melted portion 29 using the correction plate 28 in order to completely eliminate pin hoes 26 in the welding portion 25 and to ensure the sealing performance.

According to the battery module 1 of the present invention described above, since neighboring cell cases 3 share their short lateral walls, and no cooling space is provided between the cells 6, the battery module can be made compact as a whole. Further, the battery module is cooled as a whole along the long lateral walls 12 of the integral battery case 2 formed as one continuous plane, so that each of cells 6 constituting the battery module is uniformly and efficiently cooled. Moreover, since each of the cells 6 accommodates therein a group of electrode plates 5 stacked parallel to the long lateral walls of the cell cases, and the neighboring cells 6 are mutually connected in series at the opposite ends of the long lateral walls, the cells can be connected together compactly. Specifically, neighboring cells 6 can be mutually connected via connection fittings 9 through the connection holes 7 formed at the upper edge of the short lateral walls of the cell cases 3, and since the cells are connected within the integral battery case 2, the battery module can be made compact.

Further, ribs 13 are formed on the long lateral walls 12 of the integral battery case 2 such as to extend vertically at suitable intervals. Accordingly, when a plurality of integral battery cases 2 are arranged side by side with their long lateral walls 12 being mutually abutted, coolant passages 23 are formed between the ribs 13. By causing a coolant to flow in these coolant passages 23, each of the cell cases 3 can be uniformly cooled. Furthermore, a large number of circular protrusions 14 of small diameter are formed in a matrix fashion over the surfaces of the integral battery case 2 between the ribs 13. Therefore, even though the ribs 13 are arranged at large intervals so as to increase the cross-sectional area of the coolant passages 23 and even when the wall thickness t of the long lateral walls of the cell cases 3 is made thinner, the cooling performance does not deteriorate, because the protrusions 14 prevent the long lateral walls of the cell cases 3 from expanding outward by internal pressure of the cells, and thereby prevent the cross-sectional area of the coolant passages 23 to be diminished.

Moreover, connection ribs 15a, 15b are formed across the side of the integral battery case 2 and the lid member 4, whereby the lid member 4 can be coupled to the integral battery case 2 with sufficient strength. Also, the coolant can flow smoothly through the passages formed by the connection ribs, whereby the cooling performance can be further enhanced.

When arranging a plurality of integral battery cases 2 side by side to form coolant passages 23, they can be precisely positioned with each other thanks to the plurality of positioning protrusions 16 and indentations 17 provided at an upper portion and a lower portion of the outer surface of the two ribs 13 near both ends of the integral battery case 2. The coolant passages 23 can therefore be simply formed by abutting a plurality of integral battery cases together. Such positioning protrusions 16 and indentations 17 need not necessarily be formed upon the ribs 13 but can be provided on any of the circular protrusions 14 at suitable locations.

Since the thickness t of the long lateral walls of the cell cases 3 is set smaller than one tenth of the width of the short lateral walls of the cell cases 3, heat from the cells 6 can be efficiently conducted through the thin long lateral walls of the cell cases 3 to the coolant flowing through the coolant passages 23. Also, since the thickness d of the coolant passages 23 is set larger than the thickness t of the long lateral walls of the cell cases 3, the heat conducted through the thin walls of the cell cases is absorbed in a large amount of coolant, which is smoothly discharged. The battery module of the present invention thus exhibits high cooling performance.

As has been described above, the present invention provides a large capacity, long life, and high-performance battery module having a compact and high thermal diffusion structure with which each of the cells can be uniformly cooled.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module constituted by coupling a plurality rechargeable batteries together, comprising:

a plurality of prismatic cell cases having short lateral walls and long lateral walls coupled together, with adjacent short lateral walls being unitarily formed, thereby constituting an integral battery case; and a single lid member for integrally closing upper open ends of the plurality of prismatic cell cases, wherein each of the cell cases accommodates therein a group of electrodes comprising a group of positive electrode plates and a group of negative electrode plates stacked alternately upon one another parallel to the long lateral walls of the cell cases with intervening separators therebetween, thereby constituting rechargeable batteries respectively, and neighboring rechargeable batteries are connected in series at their opposite lateral ends with each other, within said integral battery case.

2. The battery module according to claim 1, wherein a plurality of ribs are formed on long lateral walls of the integral battery case such as to extend vertically at intervals.

3. The battery module according to claim 2, wherein a plurality of protrusions are provided at intervals between the ribs.

4. The battery module according to claim 3, a plurality of positioning protrusions and corresponding recesses are formed upon either one or both of said ribs and said protrusions at positions, so that, when a plurality of battery modules are arranged side by side, the positioning protrusions on one integral battery case will fit in the corresponding recesses of the adjacent integral battery case.

5. The battery module according to claim 2, wherein a plurality of protrusions are formed across the integral battery case and the lid member.

6. The battery module according to claim 5, wherein the integral battery case and the lid member are both made of resin, and said protrusions are formed from molten resin produced during thermal welding of the integral battery case and the lid member.

7. The battery module according to claim 5, wherein the integral battery case and the lid member are bonded together by thermal welding, wherein welding portions where the integral battery case and the lid member are welded together are formed flat by re-melting the welding portions with a correction plate being abutted to the welding portions.

8. The battery module according to claim 2, wherein, when a plurality of battery modules are arranged side by side, the ribs on the long lateral walls of the integral battery cases together form coolant passages, wherein the thickness of the long lateral walls of the cell cases is set smaller than the thickness of the coolant passages.

9. The battery module according to claim 1, wherein the thickness of the long lateral walls of the cell cases is set smaller than $1/10$ of the width of the short lateral walls of the cell cases.

* * * * *